(12) United States Patent
Onishi et al.

(10) Patent No.: US 8,922,845 B2
(45) Date of Patent: *Dec. 30, 2014

(54) IMAGE FORMING APPARATUS

(71) Applicant: KYOCERA Document Solutions Inc., Osaka (JP)

(72) Inventors: Kenichi Onishi, Osaka (JP); Okito Ogasahara, Osaka (JP); Naohiro Anan, Osaka (JP); Yasuaki Sakamoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 10 days.

This patent is subject to a terminal disclaimer.

(21) Appl. No.: 13/778,237

(22) Filed: Feb. 27, 2013

(65) Prior Publication Data

US 2013/0222864 A1    Aug. 29, 2013

(30) Foreign Application Priority Data

Feb. 27, 2012 (JP) ................................ 2012-039970

(51) Int. Cl.
*H04N 1/04* (2006.01)
*H04N 1/10* (2006.01)
*H04N 1/40* (2006.01)

(52) U.S. Cl.
CPC ......... *H04N 1/1008* (2013.01); *H04N 1/40037* (2013.01)
USPC ........... 358/474; 358/518; 358/505; 347/118; 382/275

(58) Field of Classification Search
CPC ............... H04N 1/4015; H04N 1/484; H04N 2005/2255; H04N 9/045; H04N 1/32112; H04N 1/3935; H04N 2201/3264; H04N 2201/3277; H04N 5/142; H04N 5/2253; H04N 5/2628; B41J 2/473; B41J 2/385; G06K 19/06
USPC ........ 358/475, 509, 1.15, 3.13, 481, 1.9, 518, 358/505, 115; 347/118, 224
See application file for complete search history.

(56) References Cited

U.S. PATENT DOCUMENTS 4,837,787 A * 6/1989 Takesue et al. ............ 372/29.02
4,890,288 A * 12/1989 Inuyama et al. ................ 372/31
5,189,529 A * 2/1993 Ishiwata et al. ............... 358/451

(Continued)

FOREIGN PATENT DOCUMENTS

JP    2005-262509    9/2005
JP    2009-262344    11/2009

*Primary Examiner* — Negussie Worku
(74) *Attorney, Agent, or Firm* — Gerald E. Hespos; Michael J. Porco; Matthew T. Hespos

(57) ABSTRACT

An image forming apparatus includes an exposing section, a pulse generating section, a frequency storing section, an emission control section, a smoothing section, and a driving-current generating section. The pulse generating section generates a periodic pulse signal indicating light amount of light beam emitted by a light source of the exposing section. The frequency storing section stores in advance a plurality of frequencies of the pulse signal. The emission control section selects, in the rendering of each main scanning line, any one of the plurality of frequencies and instructs the pulse generating section to generate the pulse signal having the selected frequency. The smoothing section smoothes the pulse signal generated by the pulse generating section according to the instruction of the emission control section and generates analog signal. The driving-current generating section generates driving current for the light source of the exposing section on the basis of the analog signal.

9 Claims, 13 Drawing Sheets

(56) References Cited

U.S. PATENT DOCUMENTS

| | | | | |
|---|---|---|---|---|
| 5,469,417 A | * | 11/1995 | Tanoue et al. | 369/47.28 |
| 5,487,172 A | * | 1/1996 | Hyatt | 712/32 |
| 5,815,287 A | * | 9/1998 | Yamada | 358/448 |
| 5,862,257 A | * | 1/1999 | Sekine et al. | 382/199 |
| 5,896,489 A | * | 4/1999 | Wada | 358/1.2 |
| 5,933,587 A | * | 8/1999 | Sakai et al. | 358/1.16 |
| 6,072,761 A | * | 6/2000 | Tani | 369/116 |
| 6,181,819 B1 | * | 1/2001 | Arimoto et al. | 382/181 |
| 6,330,077 B1 | * | 12/2001 | Sato et al. | 358/1.9 |
| 6,370,175 B1 | * | 4/2002 | Ikeda et al. | 372/38.1 |
| 7,030,956 B2 | * | 4/2006 | Nishi et al. | 352/85 |
| 7,054,490 B2 | * | 5/2006 | Sakaue et al. | 382/205 |
| 7,200,091 B2 | * | 4/2007 | Masui et al. | 369/59.11 |
| 7,518,969 B2 | * | 4/2009 | Masui et al. | 369/59.12 |
| 7,522,494 B2 | * | 4/2009 | Yamamoto | 369/47.5 |

* cited by examiner

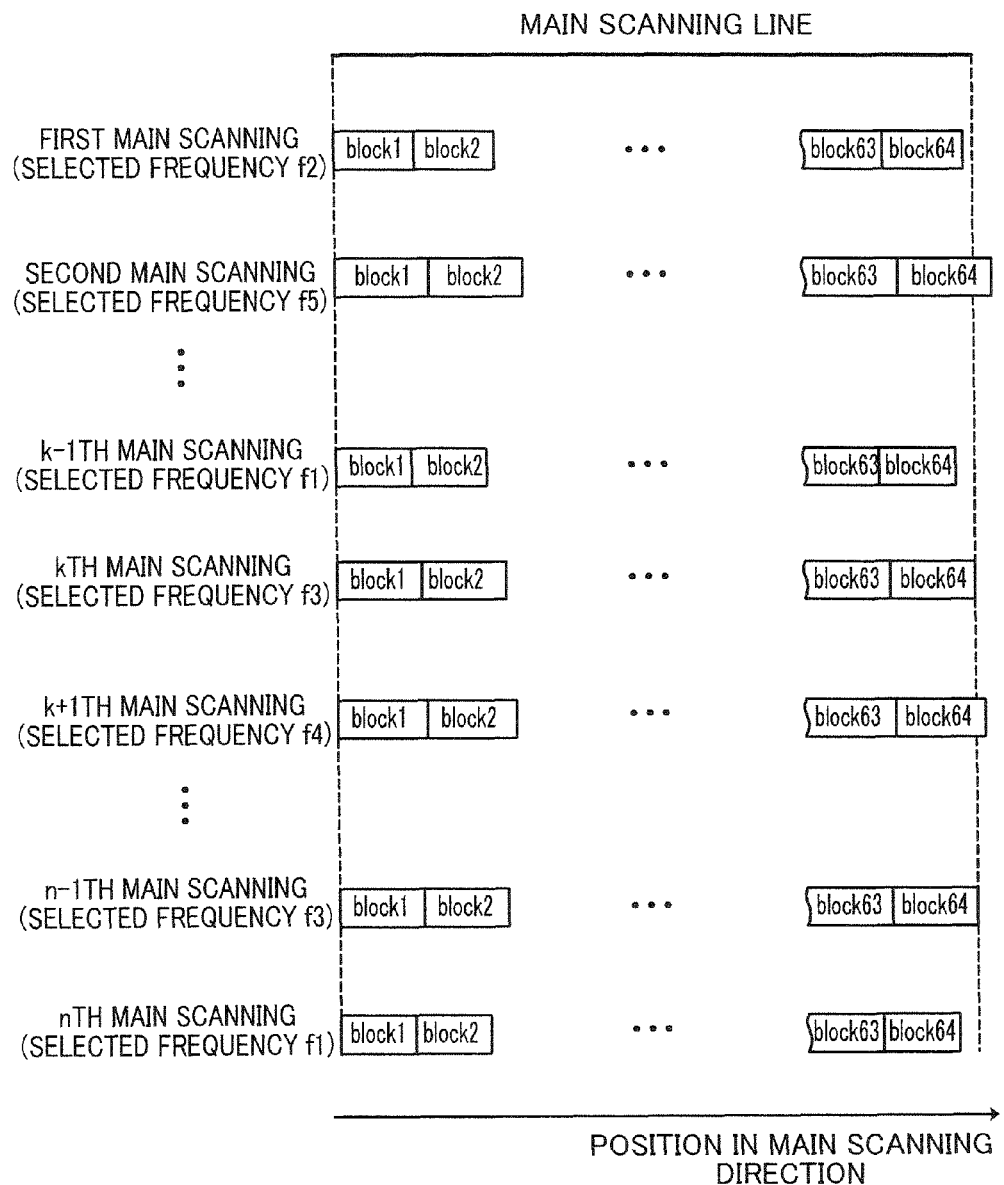

IMAGE FORMING APPARATUS

This application is based upon and claims the benefit of priority from Japanese Patent Application No. 2012-039970 filed in Japan Patent Office on Feb. 27, 2012, the entire contents of which are incorporated herein by reference.

BACKGROUND

The present disclosure relates to a technique for generating a driving current for a light source, which emits a light beam for forming an electrostatic latent image, on the basis of an analog signal generated by smoothing a periodic pulse signal indicating a light amount of the light beam.

Formation of an image by an electrophotographic system includes a step of forming an electrostatic latent image of an image indicated by image data on a photosensitive drum, a step of supplying a toner to the electrostatic latent image to form a toner image, a step of transferring the toner image onto a sheet, and a step of fixing the toner image, which is transferred onto the sheet, on the sheet.

In the step of forming an electrostatic latent image, an electrostatic latent image is formed on the photosensitive drum by repeatedly reflecting a light beam, which is emitted from a light source by subjecting the light source to light emission control, with a polygon mirror and rendering a main scanning line on the rotating photosensitive drum.

When the magnitude of a driving current for the light source is fixed and the main scanning line is rendered on the photosensitive drum, a light amount (in other words, intensity) of the light beam irradiated on the photosensitive drum is different according to a position on the photosensitive drum. As a cause of the difference in the light amount of the light beam, for example, the distance between the photosensitive drum and the polygon mirror is different in the center and at both the ends of the photosensitive drum (the distance between the polygon mirror and the center of the photosensitive drum is shorter than the distance between the polygon mirror and both the ends of the photosensitive drum). An optical characteristic of a condensing lens arranged between the polygon mirror and the photosensitive drum is also a cause of the difference in the light amount of the light beam.

When the light amount of the light beam irradiated on the photosensitive drum is different according to the position on the photosensitive drum, unevenness occurs in the density of an image.

Therefore, the magnitude of the driving current for the light source is adjusted during main scanning to fix, on the photosensitive drum, the light amount of the light beam irradiated on the photosensitive drum. For example, there is proposed a technique for dividing the main scanning line into a plurality of regions (blocks), generating a pulse width modulation (PWM) signal indicating, for each of the regions, a light amount of a light beam emitted by the light source, smoothing the PWM signal, generating an analog signal having magnitude corresponding to the light amount of the light beam, and adjusting the magnitude of the driving current for the light source on the basis of the analog signal.

When the PWM signal is smoothed to generate the analog signal, ripples occur in the analog signal according to the period of the PWM signal. The ripples sometimes cause deterioration in image quality.

When a circuit for smoothing the PWM signal is a low-pass filter consisting of a CR filter, if a time constant of the CR filter is increased, it is possible to prevent ripples from occurring in the analog signal. However, if the time constant is increased, a response time from the input of the PWM signal to the CR filter until the output of the analog signal increases, leading to a delay in control of the light amount of the light beam. Therefore, there is a limit in increasing the time constant of the CR filter.

It is an object of the present disclosure to provide an image forming apparatus that can prevent deterioration in image quality due to ripples that occur in an analog signal generated by smoothing a pulse signal and used for generating a driving current for a light source that emits a light beam for forming an electrostatic latent image.

SUMMARY

An image forming apparatus according to the present disclosure includes a photosensitive body, an exposing section, a pulse generating section, a frequency storing section, an emission control section, a smoothing section, and a driving-current generating section. The exposing section includes a light source that emits a light beam. The exposing section scans, in a main scanning direction, the light beam emitted by the light source to render a main scanning line on the photosensitive body. The pulse generating section generates a periodic pulse signal indicating a light amount of the light beam emitted by the light source. The frequency storing section stores in advance a plurality of frequencies of the pulse signal. The emission control section selects, in the rendering of each main scanning line, any one of the plurality of frequencies stored in the frequency storing section and instructs the pulse generating section to generate the pulse signal having the selected frequency. The smoothing section smoothes the pulse signal generated by the pulse generating section according to the instruction of the emission control section and generates an analog signal. The driving-current generating section generates a driving current for the light source on the basis of the analog signal generated by the smoothing section.

BRIEF DESCRIPTION OF THE DRAWINGS

FIG. 13 is a diagram showing an example of the positions in the main scanning direction of the blocks on the n main scanning lines rendered by selecting frequencies using a random number.

DETAILED DESCRIPTION

Figure 1:
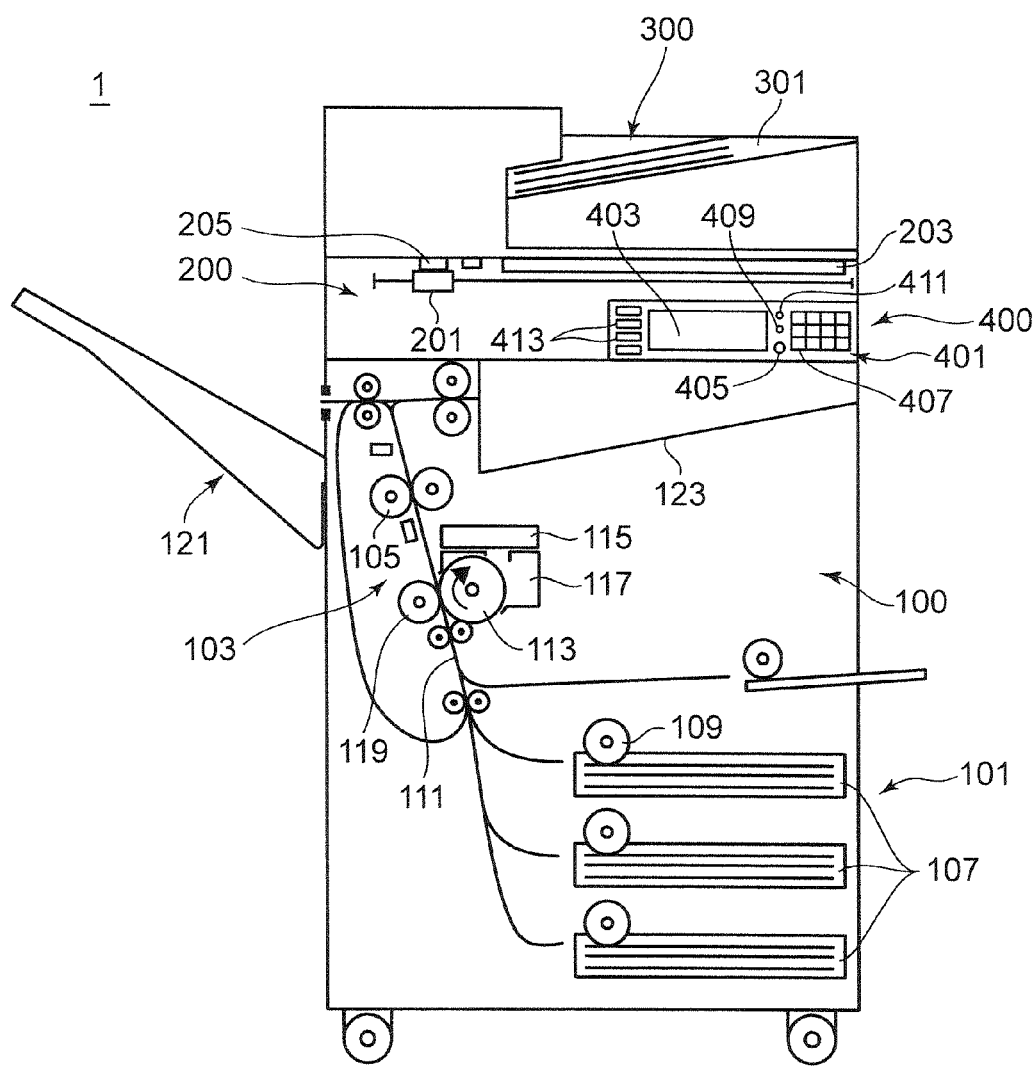
FIG. 1 is a diagram showing a schematic internal configuration of an image forming apparatus according to an embodiment of the present disclosure.

An embodiment of the present disclosure is explained below with reference to the drawings. FIG. 1 is a diagram showing a schematic internal configuration of an image forming apparatus 1 according to an embodiment of the present disclosure. The image forming apparatus 1 can be applied to, for example, a digital multifunction peripheral having functions of a copying machine, a printer, a scanner, and a facsimile. The image forming apparatus 1 includes an apparatus main body 100, a document reading section 200 arranged on the apparatus main body 100, a document feeding section 300 arranged on the document reading section 200, and an operation section 400 arranged on the upper front surface of the apparatus main body 100.

The document feeding section 300 functions as an auto document feeder. The document feeding section 300 can continuously feed a plurality of original documents placed on a document placing section 301 to the document reading section 200.

The document reading section 200 includes a carriage 201 mounted with an exposure lamp and the like, a document table 203 configured by a transparent member such as glass, a not-shown charge coupled device (CCD) sensor, and a document reading slit 205. When reading an original document placed on the document table 203, the document reading section 200 reads the original document with the CCD sensor while moving the carriage 201 in the longitudinal direction of the document table 203. On the other hand, when reading an original document fed from the document feeding section 300, the document reading section 200 moves the carriage 201 to a position opposed to the document reading slit 205 and reads the original document, which is fed from the document feeding section 300, with the CCD sensor through the document reading slit 205. The CCD sensor outputs the read original document as image data.

The apparatus main body 100 includes a sheet storing section 101, an image forming section 103, and a fixing section 105. The sheet storing section 101 is arranged in the bottom section of the apparatus main body 100. The sheet storing section 101 includes sheet trays 107 in which bundles of sheets can be stored. A sheet at the top in the bundle of sheets stored in the sheet tray 107 is delivered to a sheet conveying path 111 by the driving of a pickup roller 109. The sheet is conveyed to the image forming section 103 through the sheet conveying path 111.

The image forming section 103 forms a toner image on the sheet conveyed to the image forming section 103. The image forming section 103 includes a photosensitive drum 113, an exposing section 115, a developing section 117, and a transfer section 119. The exposing section 115 generates light modulated according to image data (image data output from the document reading section 200, image data transmitted from a personal computer, image data received by facsimile, etc.) and irradiates the light on the circumferential surface of the uniformly-charged photosensitive drum 113. Consequently, an electrostatic latent image corresponding to the image data is formed on the circumferential surface of the photosensitive drum 113. A toner is supplied from the developing section 117 to the circumferential surface of the photosensitive drum 113 in this state, whereby a toner image corresponding to the image data is formed on the circumferential surface. The toner image is transferred onto the sheet conveyed from the sheet storing section 101 by the transfer section 119.

The sheet having the toner image transferred thereon is sent to the fixing section 105. The fixing section 105 applies heat and pressure to the toner image and the sheet to fix the toner image on the sheet. The sheet is discharged to a stack tray 121 or a paper discharge tray 123.

The operation section 400 includes an operation key section 401 and a display section 403. The display section 403 has a touch panel function. A screen including soft keys is displayed on the display section 403. A user performs setting and the like necessary for execution of functions such as copying by operating the soft keys while looking at the screen.

Operation keys consisting of hard keys are provided in the operation key section 401. Specifically, a start key 405, a ten key 407, a stop key 409, a reset key 411, function switching keys 413 for switching a copying machine, a printer, a scanner, and a facsimile, and the like are provided.

The start key 405 is a key for starting operations such as copying and facsimile transmission. The ten key 407 is a key for inputting numbers such as the number of copies and a facsimile number. The stop key 409 is a key for stopping a copy operation and the like halfway. The reset key 411 is a key for resetting set content to an initial setting state.

The function switching keys 413 include a copy key and a transmission key. The function switching keys 413 are keys for switching a copy function, a transmission function, and the like. If the copy key is operated, an initial screen for copying is displayed on the display section 403. If the transmission key is operated, an initial screen for facsimile transmission and mail transmission is displayed on the display section 403.

Figure 2:
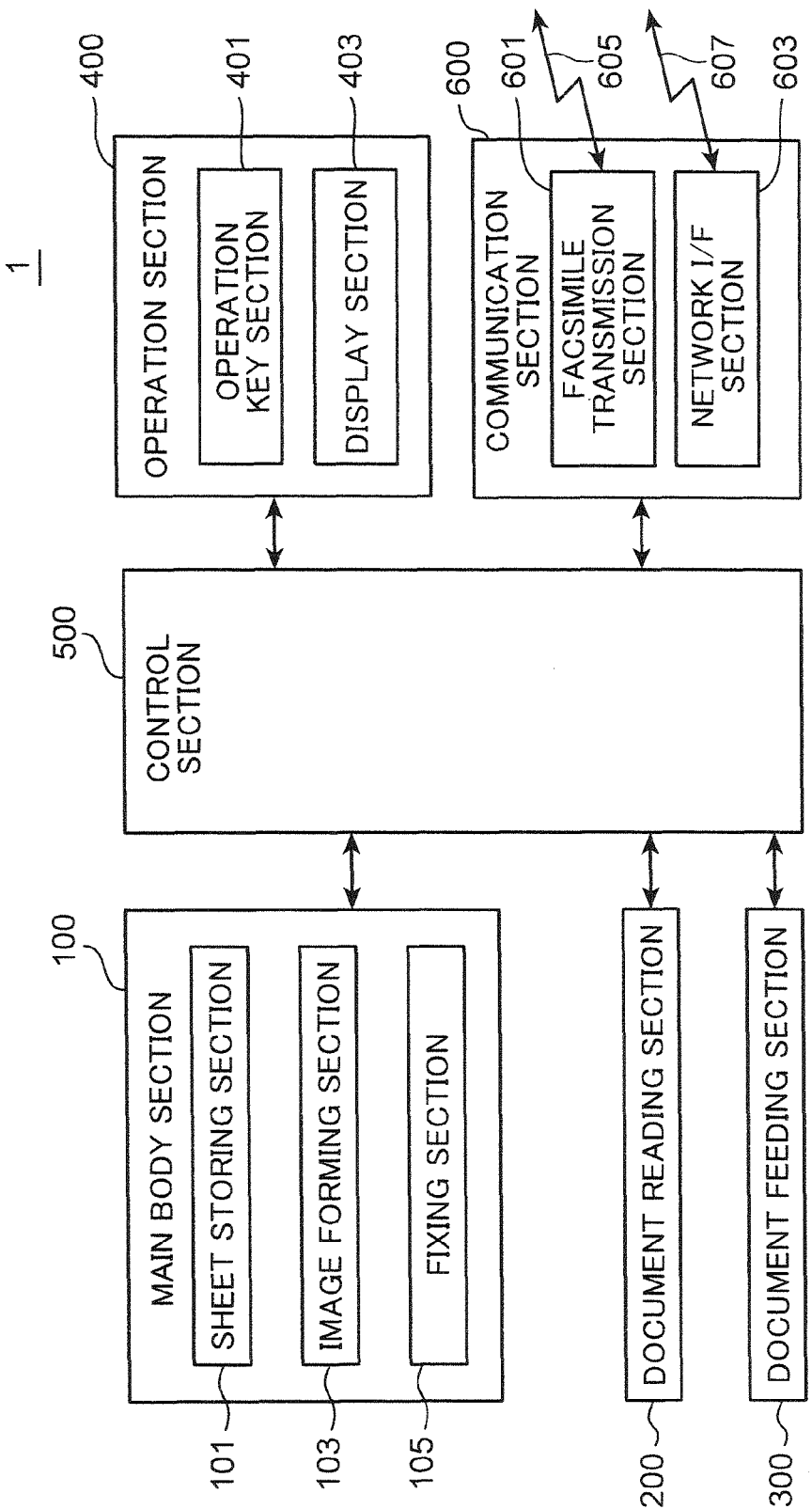
FIG. 2 is a block diagram showing the configuration of the image forming apparatus shown in FIG. 1.

FIG. 2 is a block diagram showing the configuration of the image forming apparatus 1 shown in FIG. 1. The image forming apparatus 1 has a configuration in which the apparatus main body 100, the document reading section 200, the document feeding section 300, the operation section 400, a control section 500, and a communication section 600 are connected to one another by a bus. Since the apparatus main body 100, the document reading section 200, the document feeding section 300, and the operation section 400 are explained above, explanation thereof is omitted.

The control section 500 includes a central processing unit (CPU), a read only memory (ROM), a random access memory (RAM), and an image memory. The CPU executes, on the components of the image forming apparatus 1 such as the apparatus main body 100, control necessary for operating the image forming apparatus 1. The ROM has stored therein software necessary for the control of the operation of the image forming apparatus 1. The RAM is used for, for example, temporary storage of data generated during execution of the software and storage of application software. The image memory temporarily stores image data (image data output from the document reading section 200, image data transmitted from a personal computer, image data received by facsimile, etc.).

The communication section 600 includes a facsimile communication section 601 and a network I/F section 603. The facsimile communication section 601 includes a network control unit (NCU) configured to control connection of a telephone line to a partner facsimile and a modulating and demodulating circuit configured to modulate and demodulate a signal for facsimile communication. The facsimile communication section 601 is connected to a telephone line 605.

The network I/F section 603 is connected to a local area network (LAN) 607. The network I/F section 603 is a communication interface circuit for executing communication with a terminal apparatus such as a personal computer connected to the LAN 607.

Figure 3:
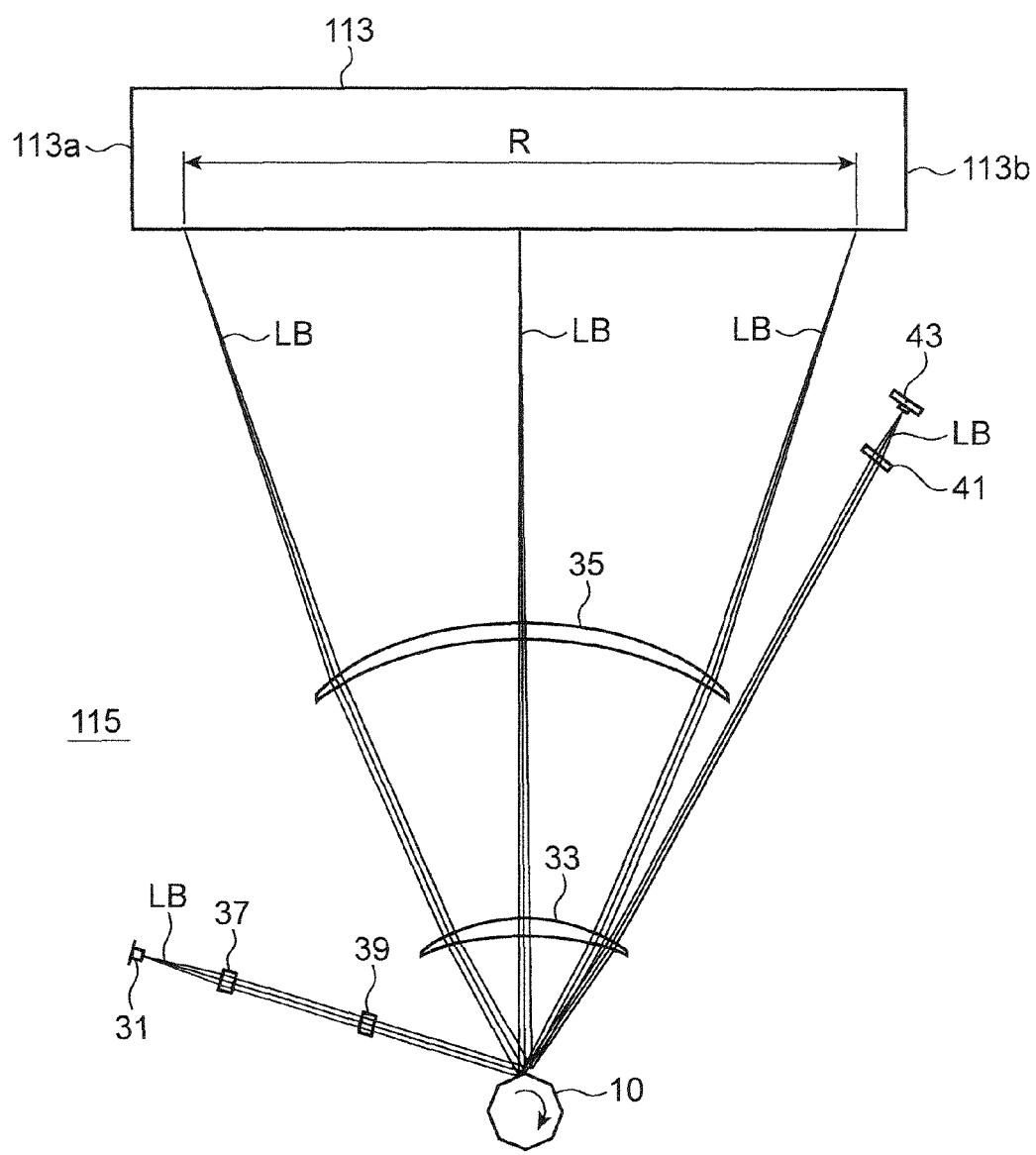
FIG. 3 is a diagram showing an arrangement relation of optical components that configure an exposing section included in the image forming apparatus shown in FIG. 1.

The exposing section 115 is explained in detail. FIG. 3 is a diagram showing an arrangement relation of optical components included in the exposing section 115. The exposing section 115 includes a light source 31, a polygon mirror 10, and two scanning lenses 33 and 35. The light source 31 is, for example, a laser diode (a semiconductor laser). The light source 31 emits a light beam LB.

A collimator lens 37 and a cylindrical lens 39 are arranged on an optical path between the light source 31 and the polygon mirror 10. The collimator lens 37 changes the light beam LB emitted from the light source 31 to parallel rays. The cylindrical lens 39 linearly condenses the light beam LB changed to the parallel rays. The linearly condensed light beam LB is made incident on the polygon mirror 10.

The scanning lens 33 and the scanning lens 35 are arranged on an optical path between the polygon mirror 10 and the photosensitive drum 113. The light beam LB made incident on a deflecting surface of the polygon mirror 10 is reflected and deflected on the deflecting surface and focused on the photosensitive drum 113 by the scanning lenses 33 and 35. That is, the light beam LB is scanned on the photosensitive drum 113, whereby an electrostatic latent image is formed on the photosensitive drum 113.

The polygon mirror 10 functions as a light deflector that reflects and deflects the light beam LB emitted by the light source 31 so as to scan the light beam LB in the main scanning direction. As the light deflector, there is a MEMS mirror other than the polygon mirror 10. The polygon mirror 10 is arranged to set the distance between the polygon mirror 10 and the center of the photosensitive drum 113 shorter than the distance between the polygon mirror 10 and one end of the photosensitive drum 113 and between the polygon mirror 10 and the other end of the photosensitive drum 113.

The exposing section 115 further includes a beam detect (BD) lens 41 and a BD sensor 43. The light beam LB scans the photosensitive drum 113 from one side portion 113a to the other side portion 113b of the photosensitive drum 113. The light beam LB exceeding an effective scanning range R is condensed by the BD lens 41 and received by the BD sensor 43. Upon receiving the light beam LB, the BD sensor 43 generates a BD signal serving as a reference for starting scanning (main scanning) on the photosensitive drum 113.

As explained above, the exposing section 115 includes the light source 31 configured to emit the light beam LB. The exposing section 115 scans the light beam LB emitted by the light source 31 in the main scanning direction to render a main scanning line on the photosensitive drum 113 (an example of a photosensitive body).

Figure 4:
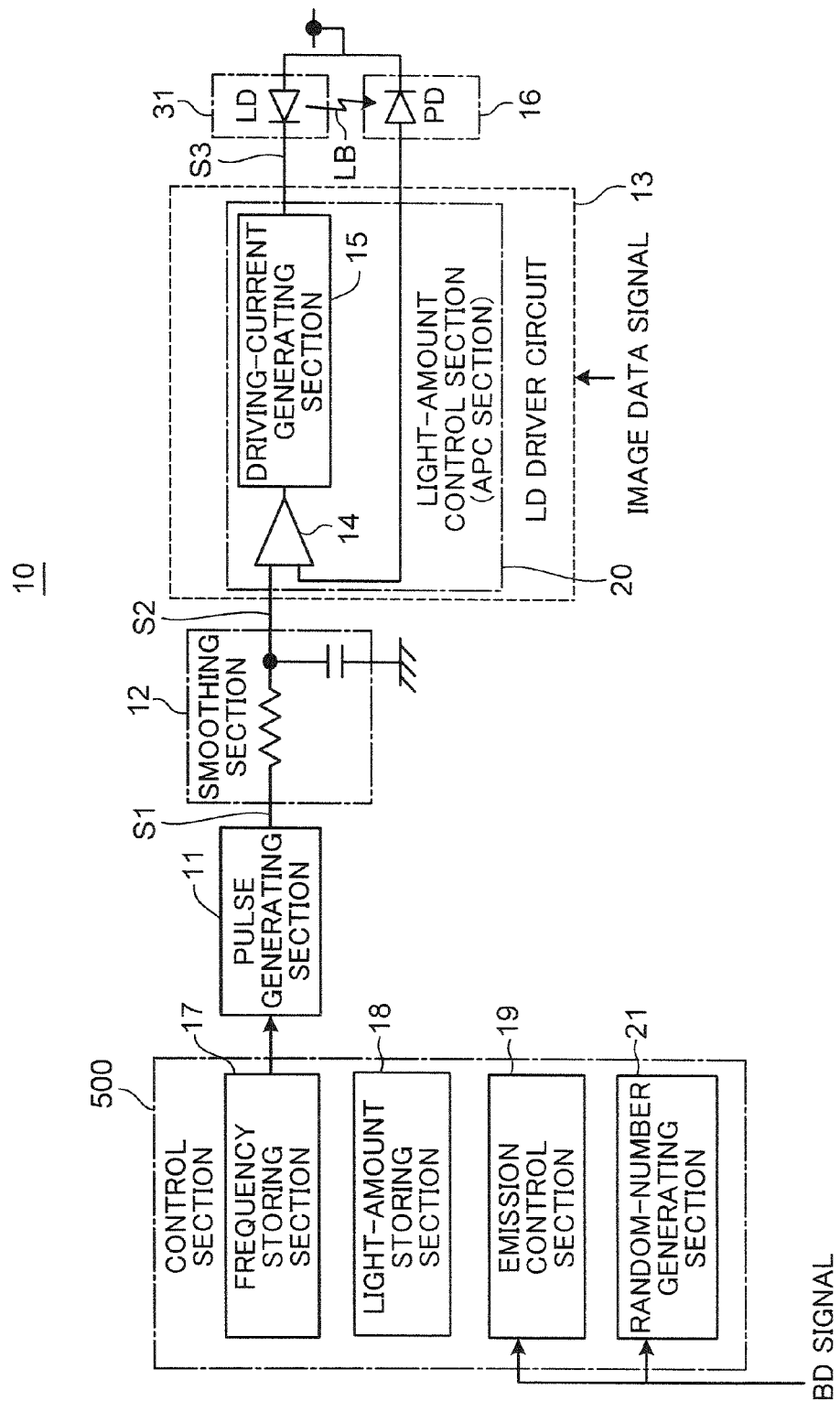
FIG. 4 is a block diagram showing the configuration of a driving current generating device that generates a driving current for a light source.

In this embodiment, a driving current for the light source 31 is generated on the basis of a pulse signal. FIG. 4 is a block diagram showing the configuration of the driving current generating device 10 configured to generate a driving current S3 for the light source 31. The driving current generating device 10 includes a pulse generating section 11, a smoothing section 12, an LD driver circuit 13, a frequency storing section 17, a light-amount storing section 18, an emission control section 19, and a random-number generating section 21.

The pulse generating section 11 generates, according to an instruction of the emission control section 19, a periodic pulse signal S1 indicating a light amount of the light beam LB emitted by the light source 31. The pulse generating section 11 is realized by, for example, an application specific integrated circuit (ASIC) or a field programmable gate array (FPGA). As the periodic pulse signal S1, for example, a PWM signal or a pulse density modulation (PDM) signal can be used. The PDM signal is a signal in which density (interval) of output of a pulse having fixed pulse width is output. In this embodiment, the PWM signal is explained as an example of the pulse signal S1 generated by the pulse generating section 11. A light amount of the light beam LB emitted by the light source 31 is indicated using a duty ratio of the PWM signal.

The smoothing section 12 is configured by a low-pass filter consisting of a CR filter. The smoothing section 12 smoothes the pulse signal S1 generated by the pulse generating section 11 and generates an analog voltage S2 (an analog signal). The analog voltage S2 indicates a light amount of the light beam LB emitted by the light source 31.

The analog voltage S2 is sent to the LD driver circuit 13. An image data signal indicating an image to be printed on a sheet is input to the LD driver circuit 13. The LD driver circuit executes, using the analog voltage S2 and the image data signal, control for generating the driving current S3 for the light source 31 and lighting control for the light source 31.

The LD driver circuit 13 includes a comparing section 14 and a driving-current generating section 15. The analog voltage S2 generated by the smoothing section 12 is input to one input section of the comparing section 14 and sent to the driving-current generating section 15. The driving-current generating section 15 generates the driving current S3 for the light source 31 using the analog voltage S2.

The light source 31 is turned on by the driving current S3 to emit the light beam LB. Besides being irradiated on the photosensitive drum 113, the light beam LB is received by a light receiving section 16 consisting of a photodiode. A signal output from the light receiving section 16 is input to the other input section of the comparing section 14.

An anode of the laser diode, which is the light source 31, is connected to a cathode of the photodiode, which is the light receiving section 16. The anode and the cathode are connected to a power supply.

A light-amount control section 20 (an APC section) is configured by the comparing section 14 and the driving-current generating section 15. The light-amount control section 20 subjects the magnitude of the driving current S3 to automatic control (APC) in an APC period to match a light amount of the light beam LB emitted by the light source 31 in an effective image period with a light amount of the light beam LB indicated by the pulse signal S1 generated by the pulse generating section 11. The effective image period means a period in which the main scanning line rendered on the photosensitive drum 113 is treated as an effective image.

The frequency storing section 17, the light-amount storing section 18, the emission control section 19, and the random-number generating section 21 are functional blocks executed by the control section 500.

The frequency storing section 17 stores in advance a plurality of frequencies of the pulse signal S1. In this embodiment, five frequencies including a frequency f1, a frequency f2, a frequency f3, a frequency f4, and a frequency f5 are explained as an example. The frequencies decrease from the frequency f1 to the frequency f5. That is, a relation f1>f2>f3>f4>f5 holds. Therefore, the frequency f1 is the highest frequency and the frequency f5 is the lowest frequency. A reference frequency is selected out of the five frequencies. In this explanation, the frequency f3 in the middle between the highest frequency and the lowest frequency is set as the reference frequency.

In this embodiment, in rendering of each main scanning line, any one of the five frequencies stored in the frequency storing section 17 is selected. The main scanning line is rendered on the photosensitive drum 113 using the pulse signal S1 having the selected frequency. A reason for this is explained below.

Figure 5:
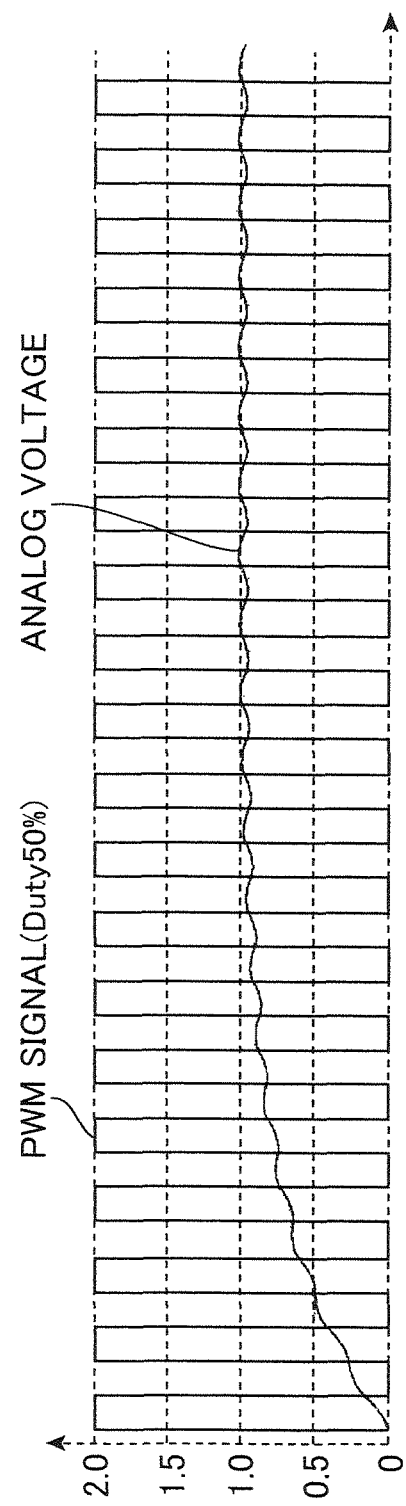
FIG. 5 is a graph representing a relation between a PWM signal having a duty ratio of 50% and an analog voltage.

First, a relation between the PWM signal, which is the pulse signal S1, generated by the pulse generating section 11, and the analog voltage S2 generated by the smoothing section 12 is explained. FIG. 5 is a graph representing this relation. The abscissa of the graph indicates time and the ordinate of the graph indicates a value of the analog voltage S2. A duty ratio of the PWM signal generated by the pulse generating section 11 is set to 50 percent.

When the pulse generating section 11 starts the generation of the PWM signal, the analog voltage S2 gradually increases from 0 V at the start of the generation of the PWM signal and reaches 1.0 V. Ripples occur in the analog voltage S2 according to a period of the PWM signal.

The present inventor has found that, when main scanning lines are rendered at the same frequency of the pulse signal S1 (the PWM signal), streak-like noise extending along the sub-scanning direction sometimes appears in an image because of the influence of the ripples that occur in the analog voltage S2.

Figure 6:
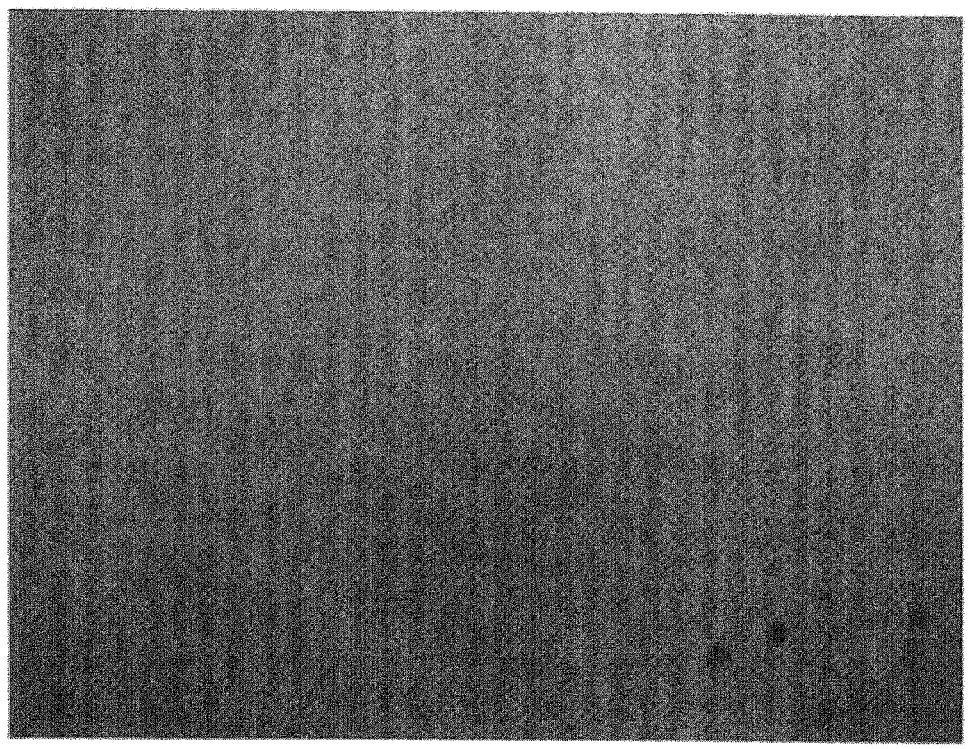
FIG. 6 is an enlarged diagram of an image in which streak-like noise extending along a sub-scanning direction appears.

FIG. 6 is an enlarged diagram of the image in which the streak-like noise extending along the sub-scanning direction appears. Longitudinal streaks are noise. The noise is considered to occur because, when the pulse signal S1 having the same frequency is used, since the positions in the main scanning direction of the ripples are aligned on the main scanning lines, the ripples are aligned along the sub-scanning direction.

Figure 7:
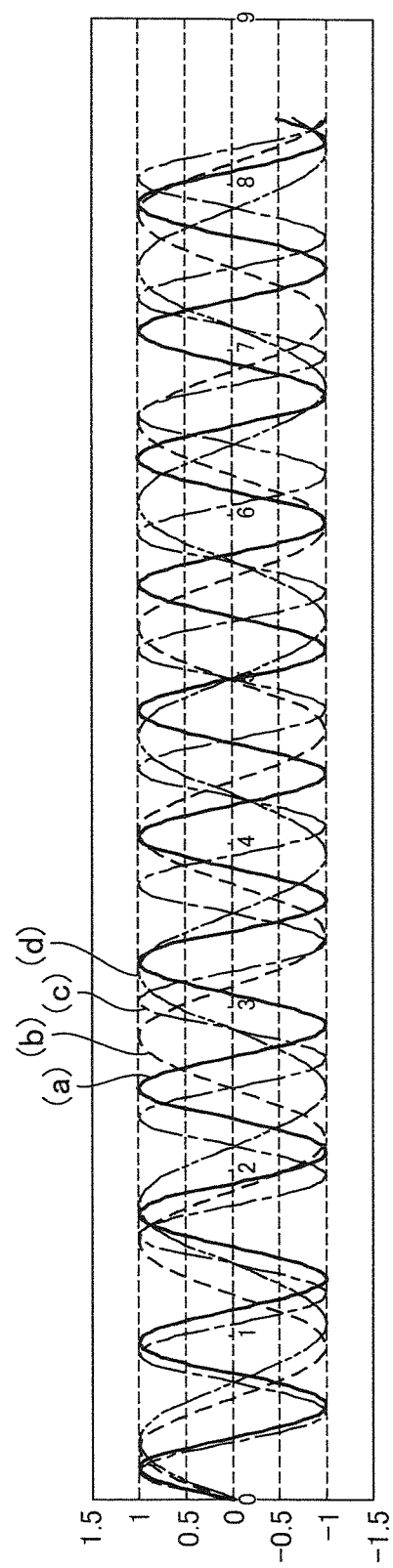
FIG. 7 is a waveform chart of an example of ripple voltages that occur in an analog voltage.

The image forming apparatus according to this embodiment selects, in rendering of each main scanning line, any one of the five frequencies stored in the frequency storing section 17 and generates the pulse signal S1 having the selected frequency. Therefore, it is possible to shift, according to a frequency, the ripples that occur in the analog voltage S2 as shown in FIG. 7. FIG. 7 is a waveform chart of voltages of the ripples that occur in the analog voltage S2. The ordinate indicates a ripple voltage and the abscissa indicated time.

Frequencies of the pulse signals S1 used for generation of an analog voltage in which a ripple voltage having a waveform indicated by (a) occurs, an analog voltage in which a ripple voltage having a waveform indicated by (b) occurs, an analog voltage in which a ripple voltage having a waveform indicated by (c) occurs, and an analog voltage in which a ripple voltage having a waveform indicated by (d) occurs are different from one another. Therefore, the peaks of the waveforms indicated by (a) to (d) do not coincide with one another.

According to this embodiment, since the main scanning lines are not rendered at the same frequency of the pulse signal S1, it is possible to prevent the positions in the main scanning direction of the ripples that occur in the analog voltage S2 from being aligned on the main scanning lines. Therefore, since it is possible to prevent the ripples from being aligned along the sub-scanning direction, it is possible to prevent streak-like noise extending along the sub-scanning direction from appearing in an image because of the influence of the ripples.

Figure 8:
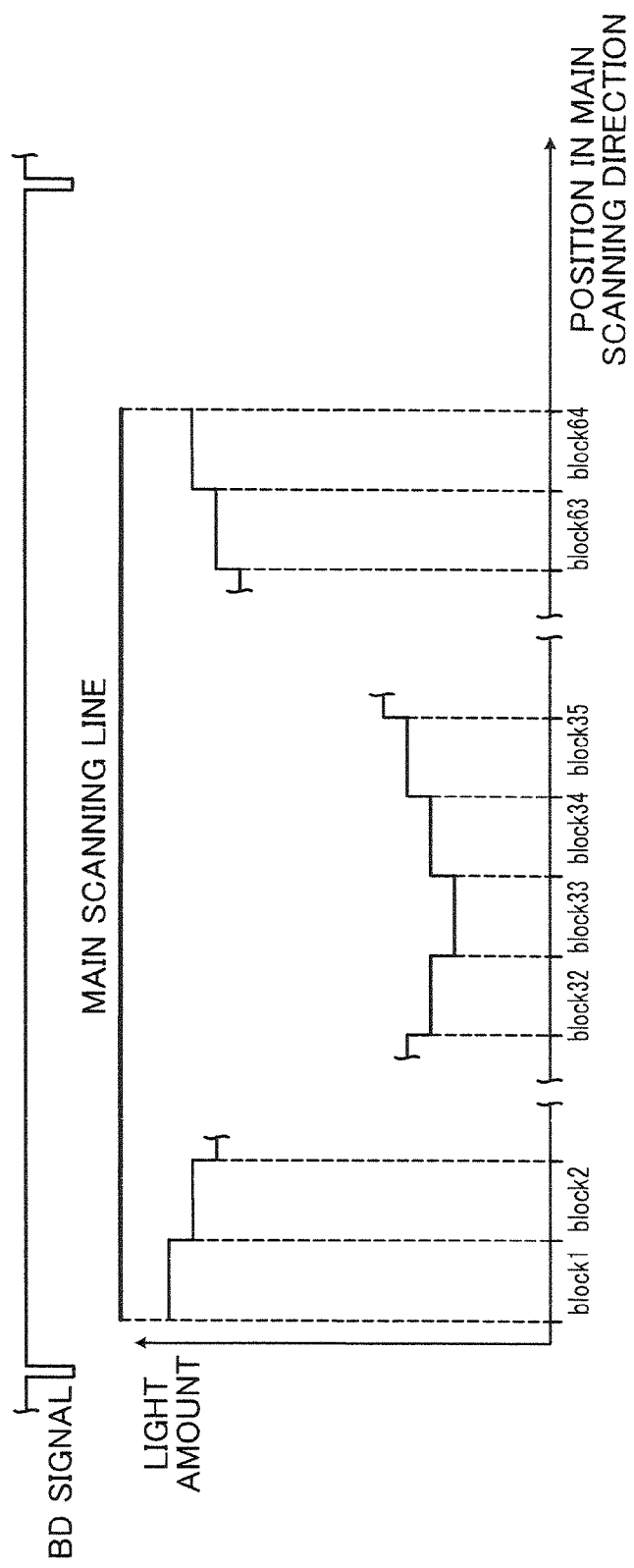
FIG. 8 is a diagram showing an example of a relation between light amounts and blocks.

Referring back to FIG. 4, when a main scanning line rendered using the pulse signal S1 having the reference frequency (the frequency f3), which is one of the five frequencies, is divided into a plurality of blocks such that the numbers of pulses of the pulse signal S1 to the blocks are the same, the light-amount storing section 18 stores in advance light amounts of the light beam LB irradiated on the blocks. FIG. 8 is a diagram showing an example of a relation between the light amounts and the blocks. The ordinate indicates a light amount and the abscissa indicates a position in the main scanning direction. In an example explained below, the number of blocks is sixty-four and the number of pulses allocated to the blocks is thirty-two.

Sixty-four blocks from a block 1 to a block 64 are arranged along the main scanning direction in order from the block 1. A light amount of the light beam LB is set for each of the blocks. Light amounts are reduced stepwise from the block 1 to the block 33 and are increased stepwise from the block 33 to the block 64. In other words, the light amounts are reduced stepwise from the one side portion 113a of the photosensitive drum 113 shown in FIG. 3 to the center and are increased stepwise from the center to the other side portion 113b. This is because, as shown in FIG. 3, the polygon mirror 10 is arranged to set the distance between the polygon mirror 10 (the light deflector) and the center of the photosensitive drum 113 shorter than the distance between the polygon mirror 10 and one end of the photosensitive drum 113 and between the polygon mirror 10 and the other end of the photosensitive drum 113.

Figure 9:
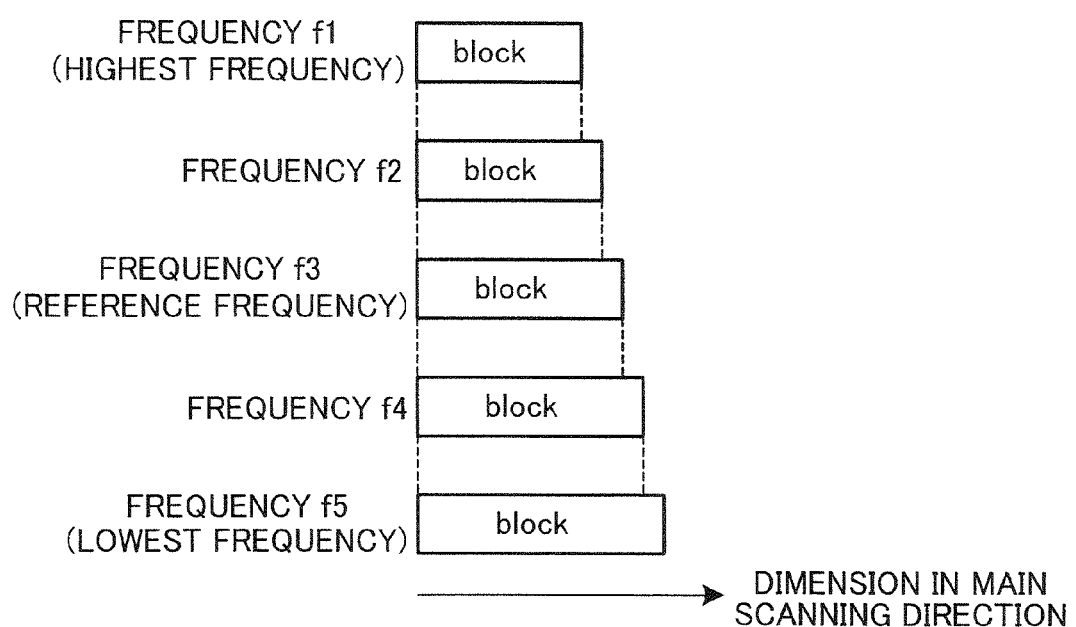
FIG. 9 is a diagram showing an example of a relation between five frequencies and dimensions in a main scanning direction of one block.
Figure 10:
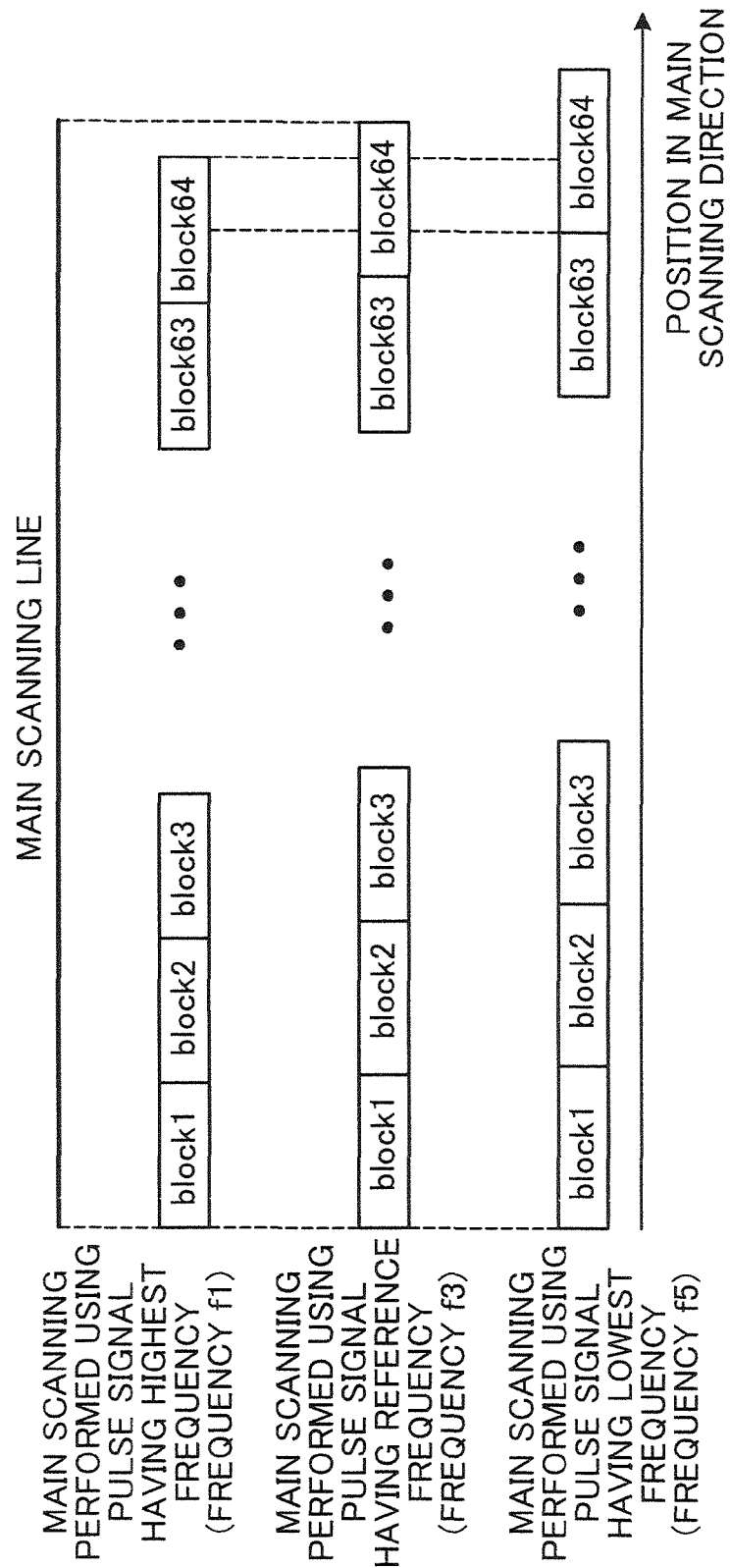
FIG. 10 is a diagram showing a first example of the positions in the main scanning direction of the blocks on main scanning lines rendered using pulse signals having a highest frequency, a reference frequency, and a lowest frequency.
Figure 11:
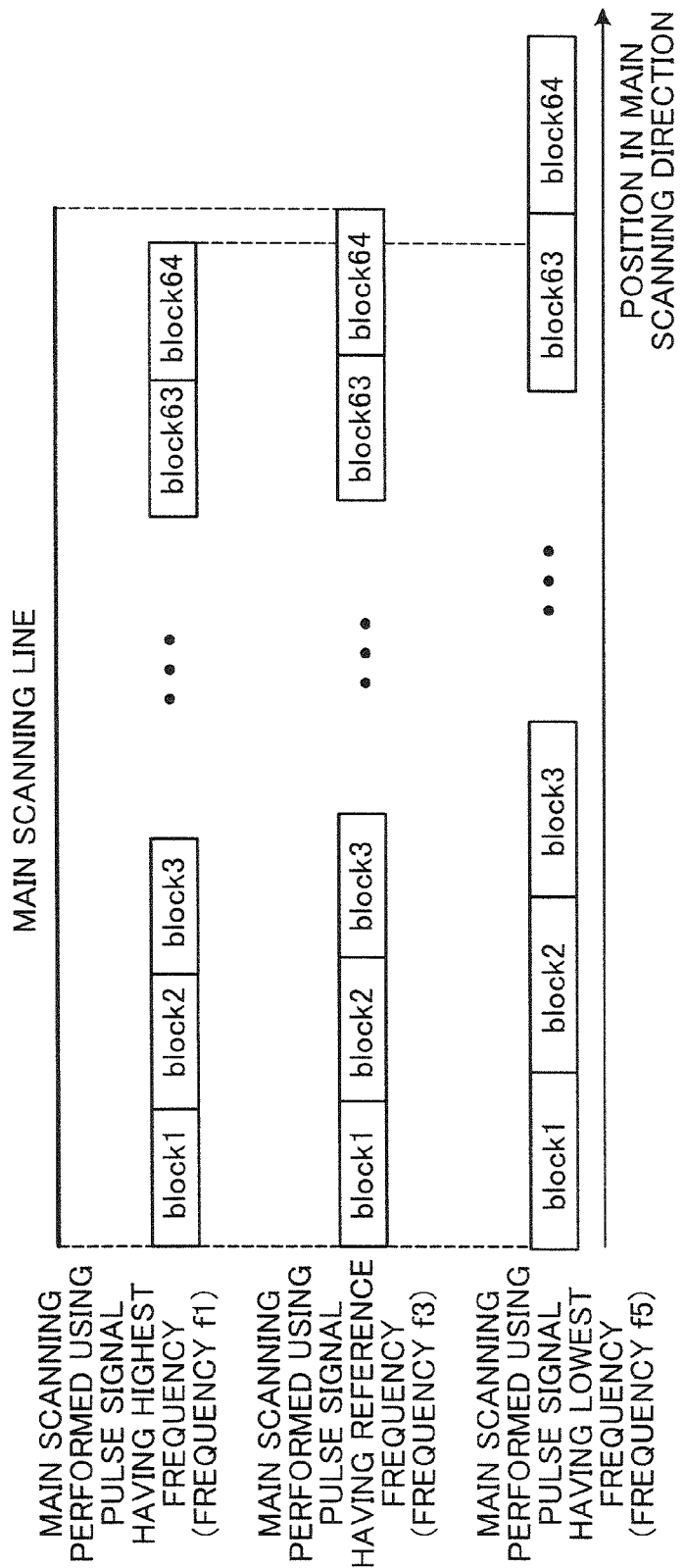
FIG. 11 is a diagram showing a second example of the positions.

FIG. 9 is a diagram showing an example of a relation between the five frequencies and dimensions in the main scanning direction of one block. FIG. 10 is a diagram showing a first example of the positions in the main scanning direction of the blocks on main scanning lines rendered using the pulse signal S1 having the highest frequency, the reference frequency, and the lowest frequency. FIG. 11 is a diagram showing a second example of the positions.

The number of pulses allocated to one block is the same. Therefore, as shown in FIG. 9, the dimension in the main scanning direction of one block is different according to the frequency of the pulse signal S1. When the frequency of the pulse signal S1 increases, the dimension in the main scanning direction of one block decreases. Conversely, when the frequency decreases, the dimension in the main scanning direction of one block increases.

Therefore, as shown in FIGS. 10 and 11, a shift occurs in the positions in the main scanning direction of the blocks according to the frequency. The shift increases as a sequence number of a block increases. If the number of blocks is sixty-four, a shift among sixty-fourth blocks (blocks 64), which are last blocks, is the largest.

In other words, when the frequency selected from the frequency storing section 17 by the emission control section 19 is different from the reference frequency, the dimension of the sixty-four blocks arranged in the main scanning direction does not coincide with the dimension of the main scanning line. That is, when the frequency selected from the frequency storing section 17 by the emission control section 19 is lower than the reference frequency (the frequency f3), the dimension of the sixty-four blocks arranged in the main scanning direction is larger than the main scanning line. Conversely, when the frequency selected from the frequency storing section 17 by the emission control section 19 is higher than the reference frequency (the frequency f3), the dimension of the sixty-four blocks arranged in the main scanning direction is smaller than the main scanning line.

In a first example shown in FIG. 10, between the block 64 in the case of the highest frequency and the block 64 in the case of the lowest frequency, parts of coordinates defining the position in the main scanning direction are common. On the other hand, in the second example shown in FIG. 11, between the block 64 in the case of the highest frequency and the block 64 in the case of the lowest frequency, coordinates defining the position in the main scanning direction are not common.

Since a light amount of the light beam LB is indicated for each of the blocks, among the plurality of main scanning lines, at least parts of coordinates defining the position in the main scanning direction need to be common between the blocks of the same sequence number.

In this embodiment, when the main scanning line is rendered using the pulse signal S1 having the highest frequency and when the main scanning line is rendered using the pulse signal S1 having the lowest frequency, a relation holds in which at least parts of coordinates defining the position in the main scanning direction of the last block (the block 64) among the sixty-four blocks are common. The relation holds between the highest frequency and the lowest frequency shown in FIG. 10. The relation does not hold between the highest frequency and the lowest frequency shown in FIG. 11.

For example, frequencies at which the relation holds can be determined as explained below. 10 MHz is set as the highest frequency and set as the reference frequency. The number of blocks is set to sixty-four. The number of pulses allocated to one block is set to thirty-two.

In this case, time of the pulse signal S1 allocated to one block (hereinafter, time of one block) is 3.2 μs because a period is 0.1 μs at 10 MHz. Since the rotating speed of the polygon mirror 10, i.e., the scanning speed for the main scanning line is fixed, the time of one block corresponds to the dimension in the main scanning direction of one block.

In order for the relation to hold, a difference between time of one block when rendering the main scanning line using the pulse signal having the highest frequency and time of one block when rendering the main scanning line using the pulse signal having the lowest frequency needs to be kept within 0.05 μs (3.4 μs/64 blocks).

Therefore, a value obtained by subtracting a value within 1.5% of the highest frequency from the highest frequency can be selected as the lowest frequency (0.05 μs/3.2 μs=0.016).

Referring back to FIG. 4, the emission control section 19 selects, in rendering of each main scanning line, any one of the five frequencies stored in the frequency storing section 17 and instructs the pulse generating section 11 to generate the pulse signal S1 having the selected frequency. In this embodiment, a light amount of the light beam LB is indicated for each of the blocks. Therefore, the emission control section 19 selects, in rendering of each main scanning line, any one of the five frequencies stored in the frequency storing section 17 and instructs the pulse generating section 11 to generate, using the selected frequency, the pulse signal S1 indicating the light amount of each of the block stored in the light-amount storing section 18. The BD signal is input to the emission control section 19. The emission control section 19 instructs the pulse generating section 11 to generate the pulse signal S1 in synchronization with the BD signal.

The BD signal is input to the random-number generating section 21. The random-number generating section 21 generates a random number every time the BD signal is input and sends the generated random number to the emission control section 19. Any one of the five frequency stored in the frequency storing section is allocated to the random number. The emission control section 19 selects the frequency, to which the random number is allocated, out of the five frequencies stored in the frequency-storing section 17. In this way, the emission control section 19 selects, in rendering of each main scanning line, the five frequencies stored in the frequency storing section 17 at random.

Figure 12:
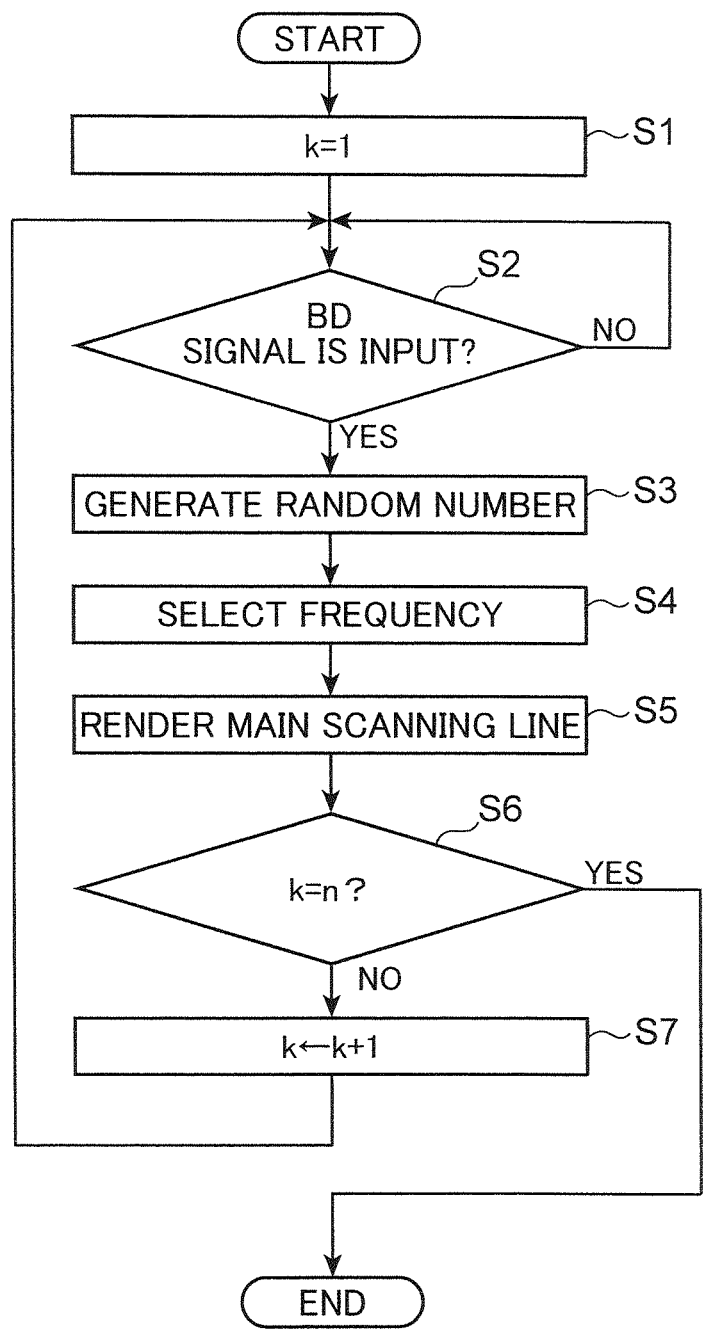
FIG. 12 is a flowchart for explaining control in rendering n main scanning lines on a photosensitive drum.

Control in rendering n main scanning lines on the photosensitive drum 113 in this embodiment is explained. FIG. 12 is a flowchart for explaining the control. The emission control section 19 stores, as 1, a variable k indicating which main scanning line is to be rendered (step S1).

The emission control section 19 and the random-number generating section 21 determine whether a BD signal is input (step S2). When the emission control section 19 and the random-number generating section 21 do not determine that the BD signal is input (No in step S2), the emission control section 19 and the random-number generating section 21 repeat the processing in step S2.

When the emission control section 19 and the random-number generating section 21 determine that the BD signal (a first BD signal) is input (Yes in step S2), the random-number generating section 21 generates a random number and sends the generated random number to the emission control section 19 (step S3).

The emission control section 19 selects a frequency, to which the random number is allocated, out of the five frequencies stored in the frequency storing section 17 (step S4). A main scanning line (a first main scanning line) is rendered on the photosensitive drum 113 (step S5). Details of the rendering of the main scanning line are as explained below.

The emission control section 19 instructs the pulse generating section 11 to generate the pulse signal S1 having the selected frequency. The pulse generating section 11 generates the pulse signal S1 on the basis of the instruction. The smoothing section 12 smoothes the pulse signal S1 and generates the analog voltage S2. The driving-current generating section 15 generates the driving current S3 on the basis of the analog voltage S2. According to the driving current S3, the exposing section 115 executes rendering of the first scanning line on the photosensitive drum 113.

The emission control section 19 determines whether the variable k is n (step S6). Since the first main scanning line is rendered, the variable k is 1. Therefore, the emission control section 19 does not determine that the variable k is n (No in step S6), stores k+1 (i.e., 2) as the variable k (step S7), and returns to step S2.

When the emission control section 19 determines that the variable k is n (Yes in step S6), since an nth main scanning line is rendered, the emission control section 19 ends the control for rendering the n main scanning lines.

An example of the positions in the main scanning direction of the blocks on the n main scanning lines rendered on the photosensitive drum 113 is shown in FIG. 13. By selecting a frequency of the pulse signal S1 at random using a random number, it is possible to prevent the frequency to be selected from regularly changing.

Major effects of this embodiment are explained. In this embodiment, in rendering of each main scanning line, any one of the five frequencies stored in the frequency storing section 17 is selected and the main scanning line is rendered using the pulse signal S1 having the selected frequency. Therefore, since the main scanning lines are not rendered at the same frequency of the pulse signal S1, it is possible to prevent the positions in the main scanning direction of the ripples that occur in the analog voltage S2 from being aligned on the main scanning lines. Therefore, since it is possible to prevent the ripples from being aligned along the sub-scanning direction, it is possible to prevent streak-like noise extending along the sub-scanning direction from appearing in an image because of the influence of the ripples. In this way, according to this embodiment, even if ripples occur in the analog signal S2 generated by smoothing a pulse signal S1 and used for generating the driving current S3 for the light source 31 that emits the light beam LB for forming an electrostatic latent image, it is possible to prevent deterioration in image quality due to the ripples.

In this embodiment, a light amount of the light beam LB is indicated for each of the blocks as explained with reference to FIG. 8, as explained with reference to FIG. 10, among the plurality of main scanning lines, at least parts of coordinates defining the position in the main scanning direction need to be common between the blocks of the same sequence number. According to this embodiment, when the main scanning line is rendered using the pulse signal S1 having the highest frequency and when the main scanning line is rendered using the pulse signal S1 having the lowest frequency, at least parts of coordinates defining the position in the main scanning direction of the last block (the block 64) among the sixty-four blocks are common. Therefore, among the plurality of main scanning lines, at least parts of coordinates defining the position in the main scanning direction can be made common between the blocks of the same sequence number.

Further, according to this embodiment, as explained in steps S3 and S4 in FIG. 12, in rendering of each main scanning line, the emission control section 19 selects the five frequencies stored in the frequency storing section 17 at random. When the frequencies are regularly selected, it is likely that, for example, although not a streak-like noise extending along the sub-scanning direction, streak-like noise extending along an oblique direction with respect to the sub-scanning direction appears in an image. According to this embodiment, since the five frequencies are selected at random, it is possible to prevent such noise from appearing in an image.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

The invention claimed is:

1. An image forming apparatus comprising:
 a photosensitive body;
 an exposing section including a light source that emits a light beam and configured to scan, in a main scanning direction, the light beam emitted by the light source to render a main scanning line on the photosensitive body;
 a pulse generating section configured to generate a periodic pulse signal indicating a light amount of the light beam emitted by the light source;
 a frequency storing section configured to store in advance a plurality of frequencies of the pulse signal;
 an emission control section configured to select, in the rendering of each main scanning line, any one of the plurality of frequencies stored in the frequency storing section and instruct the pulse generating section to generate the pulse signal having the selected frequency;
 a smoothing section configured to smooth the pulse signal generated by the pulse generating section according to the instruction of the emission control section and generate an analog signal; and
 a driving-current generating section configured to generate a driving current for the light source on the basis of the analog signal generated by the smoothing section.

2. The image forming apparatus according to claim 1, wherein
 the main scanning line rendered using the pulse signal having a reference frequency, which is one of the plurality of frequencies, is divided into a plurality of blocks, and the numbers of pulses of the pulse signal allocated to the blocks are set the same, the image forming apparatus further comprises a light-amount storing section configured to store in advance a light amount of the light beam irradiated on each of the blocks, and
 the emission control section selects, in rendering of each main scanning line, any one of the plurality of frequencies stored in the frequency storing section and instructs the pulse generating section to generate, using the selected frequency, the pulse signal indicating the light amount of each of the blocks stored in the light-amount storing section.

3. The image forming apparatus according to claim 2, wherein a range of frequencies that form the plurality of frequencies is set such that a relation holds in which at least parts of coordinates defining a position in the main scanning direction of a last block among the plurality of blocks are common when the main scanning line is rendered using the pulse signal having a highest frequency among the plurality of frequencies and when the main scanning line is rendered using the pulse signal having a lowest frequency among the plurality of frequencies.

4. The image forming apparatus according to claim 3, wherein
 the exposing section includes a light deflector configured to reflect and deflect the light beam emitted by the light source so as to scan the light beam in the main scanning direction, and
 the light deflector is arranged such that a distance between the light deflector and a center of the photosensitive body is shorter than a distance between the light deflector and one end of the photosensitive body and a distance between the light deflector and the other end of the photosensitive body.

5. The image forming apparatus according to claim 4, wherein, in the plurality of blocks, light amounts allocated to the blocks are reduced stepwise from the one end of the photosensitive body toward the center of the photosensitive body and are increased stepwise from the center toward the other end of the photosensitive body.

6. The image forming apparatus according to claim 1, wherein, in rendering of each main scanning line, the emission control section selects the plurality of frequencies stored in the frequency storing section at random.

7. The image forming apparatus according to claim 6, further comprising:
 a BD sensor configured to receive the light beam emitted from the light source to thereby generate a BD signal serving as a reference for starting rendering of the main scanning line; and
 a random-number generating section configured to receive an input of the BD signal and generate a random number every time the BD signal is input, wherein
 the emission control section selects, out of the plurality of frequencies stored in the frequency storing section, a frequency allocated to the random number.

8. The image forming apparatus according to claim 1, wherein the smoothing section is a low-pass filter formed of a capacitor and a resistor.

9. The image forming apparatus according to claim 8, wherein the pulse generating section generates a PWM signal or a PDM signal as the pulse signal.

* * * * *